US011915888B2

(12) United States Patent
Roininen et al.

(10) Patent No.: US 11,915,888 B2
(45) Date of Patent: Feb. 27, 2024

(54) HYBRID CURRENT PATH FOR CIRCUIT BREAKERS

(71) Applicant: HITACHI ENERGY LTD, Zürich (CH)

(72) Inventors: Tomas Roininen, Saxdalen (SE); Benny Wedin, Grängesberg (SE); Lars Jeppsson, Kopparberg (SE); Kent Kirjonen, Grängesberg (SE); Leif Persson, Grängesberg (SE)

(73) Assignee: HITACHI ENERGY LTD, Zurich (CH)

( * ) Notice: Subject to any disclaimer, the term of this patent is extended or adjusted under 35 U.S.C. 154(b) by 0 days.

(21) Appl. No.: 18/013,825

(22) PCT Filed: Jun. 29, 2021

(86) PCT No.: PCT/EP2021/067809

§ 371 (c)(1),
(2) Date: Dec. 29, 2022

(87) PCT Pub. No.: WO2022/002912

PCT Pub. Date: Jan. 6, 2022

(65) Prior Publication Data

US 2023/0197363 A1 Jun. 22, 2023

(30) Foreign Application Priority Data

Jun. 30, 2020 (EP) .................................... 20183167

(51) Int. Cl.
*H01H 1/38* (2006.01)

(52) U.S. Cl.
CPC .................................. *H01H 1/385* (2013.01)

(58) Field of Classification Search
CPC .......... H01H 1/385; H01H 1/025; H01H 1/60; H01H 1/04; H01H 1/38; H01H 11/04;
(Continued)

(56) References Cited

U.S. PATENT DOCUMENTS 4,072,392 A * 2/1978 McConnell ............ H01R 13/18 439/851
4,413,166 A * 11/1983 Meyer .................... H01H 31/32 218/80
(Continued)

FOREIGN PATENT DOCUMENTS

CH 494467 A 7/1970
CN 1835165 A 9/2006
(Continued)

OTHER PUBLICATIONS

International Search Report and Written Opinion of the International Searching Authority, PCT/EP2021/067809, dated Oct. 14, 2021, 15 pages.
(Continued)

*Primary Examiner* — William A Bolton
(74) *Attorney, Agent, or Firm* — Sage Patent Group

(57) ABSTRACT

A conductor arrangement for a circuit breaker interrupter, the conductor arrangement including: a tubular body conductor including a first metal material, and an at least partly tubular contact conductor including a second metal material; wherein a tubular end portion of the tubular body conductor is mechanically and electrically joined with a tubular end portion of the tubular contact conductor in an circumferential overlap region formed by longitudinally press-fitting one of the tubular body conductor and the tubular contact conductor into the other one of the tubular body conductor and the tubular contact conductor, wherein the outer one of the tubular end portions of the tubular body conductor and the at least partly tubular contact conductor at the overlap region includes copper and the inner one includes aluminum.

20 Claims, 5 Drawing Sheets

(58) Field of Classification Search
CPC ... H01H 11/06; H01H 2011/067; H01H 33/12
USPC ............................ 218/67, 70, 74, 75, 79, 80
See application file for complete search history.

(56) References Cited

U.S. PATENT DOCUMENTS

| | | | | |
|---|---|---|---|---|
| 4,427,862 | A | 1/1984 | Lin | |
| 5,981,893 | A * | 11/1999 | Bleiker | H01H 1/38 218/123 |
| 6,059,577 | A * | 5/2000 | Eriksson | H01H 1/38 439/8 |
| 8,232,496 | B2 * | 7/2012 | Granhaug | H01H 1/385 218/46 |
| 8,902,026 | B2 * | 12/2014 | Fujita | H01H 33/182 218/27 |
| 10,186,389 | B2 * | 1/2019 | Aitken | H01H 33/12 |
| 2007/0246444 | A1 | 10/2007 | Saxl et al. | |
| 2014/0360984 | A1 * | 12/2014 | Moriyama | H01H 33/12 218/146 |
| 2017/0263397 | A1 * | 9/2017 | Sotnikov | H01H 1/02 |

FOREIGN PATENT DOCUMENTS

| | | | |
|---|---|---|---|
| CN | 210628170 | U | 5/2020 |
| DE | 2935202 | A1 | 3/1981 |
| DE | 19803974 | C1 | 8/1999 |
| EP | 0932172 | A2 | 7/1999 |
| EP | 1675142 | A1 | 6/2006 |
| GB | 1264756 | A | 2/1972 |

OTHER PUBLICATIONS

Partial European Search Report dated Dec. 17, 2020 for European Patent Application No. 20183167.4, 13 pages.

Extended European Search Report dated Mach 22, 2021 for European Patent Application No. 20183167.4, 12 pages.

First Office Action for Chinese Patent Application No. 202180036174.1, dated Mar. 17, 2023, 12 pages.

* cited by examiner

HYBRID CURRENT PATH FOR CIRCUIT BREAKERS

CROSS REFERENCE TO RELATED APPLICATIONS

This application is a 35 U.S.C. § 371 national stage application of PCT International Application No. PCT/EP2021/067809 filed on Jun. 29, 2021, which in turn claims foreign priority to European Patent Application No. 20183167.4, filed on Jun. 30, 2020, the disclosures and content of which are incorporated by reference herein in their entirety.

FIELD OF THE DISCLOSURE

The present disclosure relates to a conductor arrangement for a circuit breaker interrupter, to a method for manufacturing a conductor path for a circuit breaker interrupter, and to a conductor assembly for a circuit breaker interrupter.

BACKGROUND

High and medium voltage circuit breakers of gas-insulated switchgear, live tank or dead tank type contains internal current paths. Regardless of the type, the circuit breakers internal current paths are often made from either casted aluminum or press formed copper.

Copper and aluminum have their advantages related to e.g. lower cost of aluminum and the electrical properties and integration capability of copper parts. On the downside, aluminum current paths are generally bulky and may employ casting and machining and therefore has low material utilization, and copper is a costly material.

Accordingly, there is room for improvement in currents paths of breakers and disconnectors of gas-insulated switchgear and similar equipment.

SUMMARY

In view of the above-mentioned and other drawbacks of the prior art, it is an object of the present disclosure to provide conductor arrangement for a circuit breaker interrupter that alleviates at least some of the drawbacks with prior art. The proposed conductor arrangement provides for a cost-efficient solution with improved material utilization that combines the benefits of two different metal materials.

According to a first aspect of the disclosure, there is provided a conductor arrangement for a circuit breaker interrupter, the conductor arrangement comprising: a tubular body conductor comprising a first metal material, and an at least partly tubular contact conductor comprising a second metal material; wherein a tubular end portion of the tubular body conductor is mechanically and electrically joined with a tubular end portion of the tubular contact conductor in an circumferential overlap region formed by longitudinally press-fitting one of the tubular body conductor and the tubular contact conductor into the other one of the tubular body conductor and the tubular contact conductor, wherein the outer one of the tubular end portions of the tubular body conductor and the at least partly tubular contact conductor at the overlap region comprises copper and the inner one comprises aluminum.

The present disclosure is at least partly based on the realization to provide a tubular body conductor and a tubular contact conductor which provides for improved material utilization since no or very little machining may be employed. The present disclosure is further based on the realization to electrically and mechanically connect the tubular body conductor and the tubular contact conductor using a longitudinal press-fitting technique based on fitting the smaller one of the tubular body conductor and the tubular contact conductor in the larger one, in terms of diameter. The fitting between the tubular body conductor and the tubular contact conductor is such that during the press-fitting, the materials are pressed into each other at molecular level which provides a secure mechanical fit with superior electrical conducting properties, in other words, the resistivity of the joint between the two materials in the overlap region is sufficiently low.

That the body conductor and the contact conductor are tubular means that they are hollow and has a circular cross-section in a plane orthogonal to the longitudinal axis of the tube shape. The tubular body conductor and the tubular contact conductor may be manufacture by press forming which provides for good material utilization.

The circumferential overlap region extends in a distance along the longitudinal direction of the tubular body and contact conductors. The circumferential overlap region also extends around the circumferences of the tubular body and contact conductors, i.e. as a ribbon along the circumferences.

The tubular contact conductor may be referred to as a contact crown.

Embodiments of the present disclosure provides advantages such as high material utilization since relatively thin tubes may be used, prior art castings may employ more raw material. Further, embodiments provide for low production cost since shaping of current paths can be made by presses without or with very little need for mechanical machining for shaping of the tubular conductor current paths including the contact crown. In addition, the manufacturing is well suited for automation due to that relatively few parts are needed, and they can be produced in an automated production process. Embodiments further provide for high strength joint with low electrical resistance in the overlap region.

In embodiments, the dimensions of the tubular end portions of the tubular body conductor and the least partly tubular contact conductor may be such that the outer one of the tubular end portions expands radially as a result of the longitudinal press-fitting and the inner one of the tubular end portions is compressed as a result of the longitudinal press-fitting.

In other words, the outer diameter of the inner one of the tubular body conductor and the least partly tubular contact conductor is slightly larger than the inner diameter of the outer one of the of the tubular body conductor and the least partly tubular contact conductor. This advantageously provides for an improved joint between the of the tubular body conductor and the least partly tubular contact conductor in the overlap region.

In embodiments, a thermal expansion coefficient of the inner one of the tubular end portions of the tubular body conductor and the least partly tubular contact conductor in the overlap region is larger than the thermal expansion of the outer one. This advantageously provides for the joint to be maintained strong even during temperature fluctuations. If the temperature increases, the inner one of the tubular body conductor and the least partly tubular contact conductor will expand more than the outer one.

Preferably, the tubular body conductor and the at least partly tubular contact conductor may be produced from press-forming of tubes of the respective material. This reduces the amount of material needed and thus improves material utilization and lowers cost.

In embodiments, the outer one of the tubular end portions of the tubular body conductor and the at least partly tubular contact conductor at the overlap region may comprise copper and the inner one may comprise aluminum. For example, the first metal material may aluminum and the second metal material may be copper. In this way may the lower cost of aluminum be combined with the excellent electrical conductivity properties of copper.

In embodiments, the at least partly tubular contact conductor may comprise longitudinal contact members on an opposite side from the tubular end portion, the longitudinal contact members being formed in one piece with the tubular end portion and extending longitudinally away from the tubular end portion. The longitudinal contact members may be in the form of "fingers" and provide a contact crown for the conductor arrangement. Forming them in one piece with the tubular end portion provides for more efficient manufacturing and reduced cost. For example, the longitudinal contact members may be producible by press-forming.

The length of the overlap region may depend on the specific implementations. However, preferably, the length of the overlap region may be substantially larger than the thickness of any one of the tubular body conductor and the at least partly tubular contact conductor in the overlap region. This at least partly ensures a strong mechanical coupling between the tubular body conductor and the at least partly tubular contact conductor.

In embodiments, the tubular end portion of the tubular body conductor may comprise a fitting portion having smaller diameter than a neighboring portion, where at least part of the fitting portion is included in the overlap region. This advantageously provides for better controlling the fitting properties between the tubular body conductor and the at least partly tubular contact conductor. Thus, the tubular body conductor may have various dimensions as long as the fitting portion is of appropriate dimensions for the press-fitting with the tubular contact conductor. However, the tubular body conductor may in other possible and advantageous implementations have a single diameter through-out the entire length of the tubular body conductor.

In embodiments, the conductor arrangement may comprise a arcing contact holder flange adapted to hold an arcing contact pin for the circuit breaker interrupter, wherein the arcing contact holder flange is attached inside and along an inner circumference of the tubular body conductor by radially compressing the tubular body conductor onto the arcing contact holder flange. Thus, the arcing contact holder flange may be attached to the inner side of the tubular body conductor by a labor and cost-efficient radial compression.

The arcing contact holder flange may comprise radially protruding attachment members adapted to permanently deform the inner surface of the tubular body conductor when the tubular body conductor is radially compressed onto the arcing contact holder flange.

According to a second aspect of the disclosure, there is provided a method for manufacturing a conductor path for a circuit breaker interrupter, the method comprising: press-forming a first tube made from a first metal material to form a tubular body conductor comprising a tubular end portion; press-forming a second tube made from a second metal material to form a tubular contact conductor comprising a tubular end portion and longitudinal contact members on an opposite side from the tubular end portion, the longitudinal contact members being adapted for making electric contact with an external contact; and pressing the tubular body conductor and the tubular contact conductor against each other in a longitudinal direction of the tubular body conductor and the tubular contact conductor so that an overlap region is produced where the tubular body conductor and the tubular contact conductor are mechanically and electrically connected to each other, wherein the outer one of the tubular end portions of the tubular body conductor and the at least partly tubular contact conductor at the overlap region comprises copper and the inner one comprises aluminum.

Further effects and features of the second aspect of the disclosure are largely analogous to those described above in connection with the first aspect of the disclosure.

According to an embodiment, there is provided a conductor assembly for a circuit breaker interrupter, the conductor assembly comprising: a tubular body conductor comprising a first metal material, and an arcing contact holder flange comprising a third metal material and being adapted to hold an arcing contact pin for the circuit breaker interrupter, wherein the arcing contact holder flange is attached inside and along an inner circumference of the tubular body conductor by radially compressing the tubular body conductor onto the arcing contact holder flange.

A cost-efficient and manufacturing efficient way of attaching a arcing contact holder flange to a tubular body conductor is to adapt the arcing contact holder flange such that it can be attached to the inner side of the tubular body conductor by radially compressing on the tubular body conductor where the arcing contact holder flange is arranged inside.

An arcing contact includes the holder flange for holding an arcing pin. During interruption the current will be directed through the arcing contacts in the circuit breaker interrupter.

In embodiments, the first metal material is softer than the third metal material.

Further effects and features of the third aspect of the disclosure are largely analogous to those described above in connection with the first aspect and the second aspect of the disclosure.

Further features of, and advantages with, the present disclosure will become apparent when studying the appended claims and the following description. The skilled person realize that different features of the present disclosure may be combined to create embodiments other than those described in the following, without departing from the scope of the present disclosure. Even though some embodiments have been summarized above, the claimed subject matter is defined in the attached claims.

BRIEF DESCRIPTION OF THE DRAWINGS

These and other aspects of the present disclosure will now be described in more detail, with reference to the appended drawings showing an example embodiment of the disclosure, wherein.

DETAILED DESCRIPTION OF EXAMPLE EMBODIMENTS

In the present detailed description, various embodiments of the present disclosure are herein described with reference to specific implementations. In describing embodiments, specific terminology is employed for the sake of clarity. However, the disclosure is not intended to be limited to the specific terminology so selected. While specific exemplary embodiments are discussed, it should be understood that this is done for illustration purposes only. A person skilled in the relevant art will recognize that other components and configurations can be used without parting from the scope of the disclosure.

Figure 1:
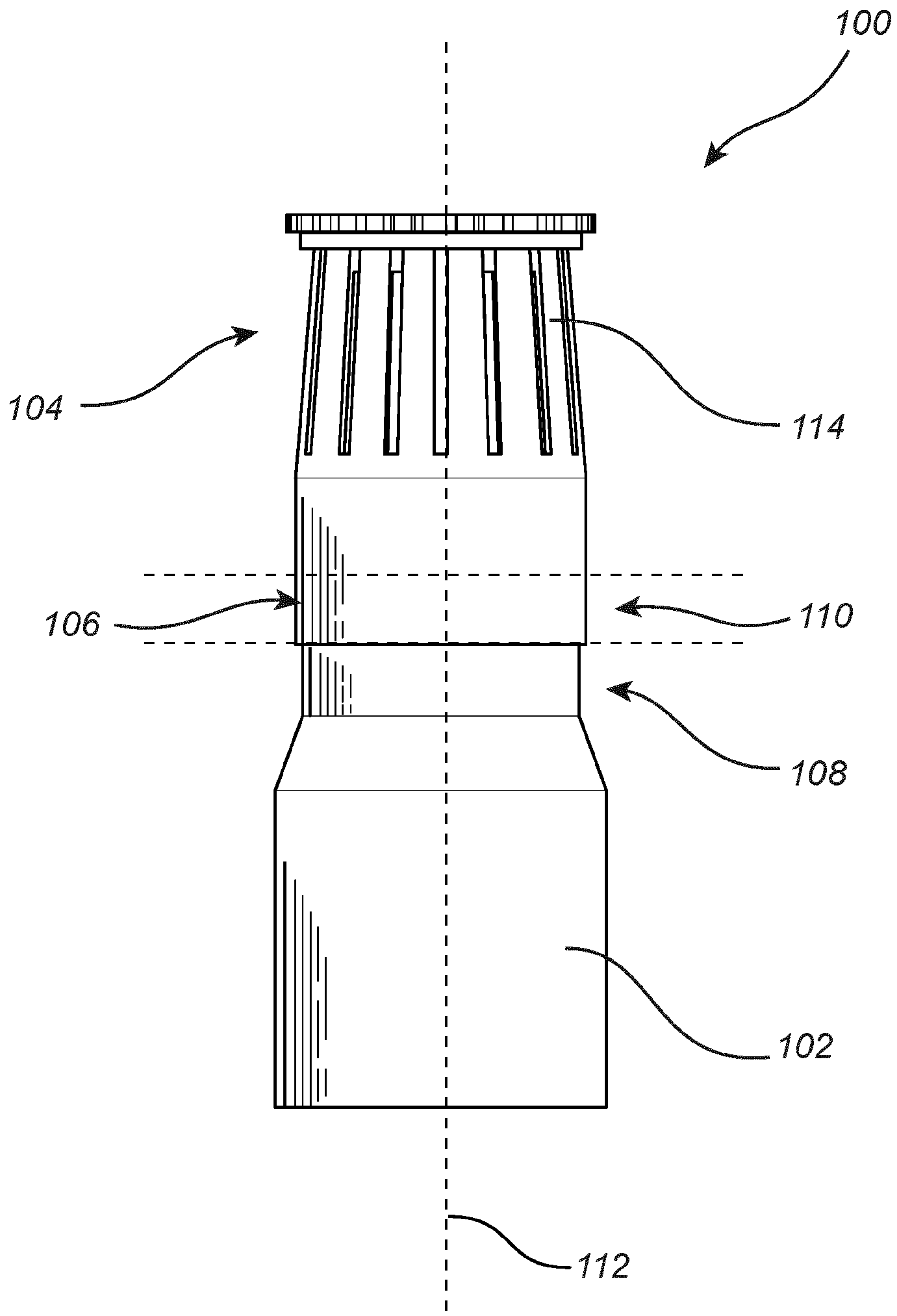
FIG. 1 conceptually illustrates a conductor arrangement according to an embodiment of the disclosure.

FIG. 1 conceptually illustrates a conductor arrangement 100 for a circuit breaker interrupter. The conductor arrangement 100 comprises a tubular body conductor 102 comprising a first metal material, and an at least partly tubular contact conductor 104 comprising a second metal material. The at least partly tubular contact conductor 104 comprises a tubular end portion 106.

For assembly, a tubular end portion 108 of the tubular body conductor 102 is mechanically and electrically joined with the tubular end portion 106 of the tubular contact conductor 104. The joint forms a circumferential overlap region 110 between the tubular end portions 106, 108. As will be discussed further, the overlap region 110 is formed by longitudinally press-fitting one of the tubular body conductor 102 and the tubular contact conductor 104 into the other one of the tubular body conductor 102 and the tubular contact conductor 104.

The longitudinal extension of the tubular body conductor 102 and the tubular contact conductor 104 is here indicated by the dashed line 112. Thus, the press-fitting is performed along the tubular shape of the tubular body conductor 102 and the tubular contact conductor 104 such that they share a common axis 112, i.e. being coaxially arranged.

Further, in this example embodiment, the at least partly tubular contact conductor 104 comprises longitudinal contact members 114 on an opposite side from the tubular end portion 106. The longitudinal contact members 114 being formed in one piece with the tubular end portion 106 and extending longitudinally away from the tubular end portion 106. The longitudinal contact members 114 are arranged on a distal end of the tubular contact conductor 104 away from the overlap region 110.

The longitudinal contact members 114 form a contact crown for the conductor arrangement and are thus adapted to make electrical contact for conducting high- or medium voltages for the circuit breaker interrupter, e.g. in a gas-insulated switchgear.

Preferably, the outer one of the tubular end portions 106, 108 of the tubular body conductor 102 and the at least partly tubular contact conductor 106 at the overlap region 110 comprises copper and the inner one comprises aluminum. For example, in this example embodiment, the tubular body conductor 102 is made from aluminum or an aluminum alloy being the first material, and the tubular contact conductor 104 is made from copper being the second material. In this way may the advantages of aluminum and copper be combined. Thus, the advantageous electrical properties such as relatively high conductivity of copper is combined with the low cost of aluminum.

Further, the tubular shape of the tubular body conductor 102 and the tubular contact conductor 104 provides for using less material, i.e. less copper and aluminum. Thus, the walls of the tubes are determined from the raw tubular material and material is not lost by machining casted items, for example. Accordingly, preferably, the tubular body conductor 102 and the at least partly tubular contact conductor 104 are produced from press-forming of tubes of the respective material.

The contact crown comprising the longitudinal contact members 114 is preferably pre-shaped with pressing blanking of longitudinal contact members 114, shaping the longitudinal contact members 114 and silver plating the longitudinal contact members 114 before being pressed to the aluminum tubular body conductor 102. The design with forming of the longitudinal contact members 114, e.g. contact fingers 114, directly from a copper tube reduces the amount of parts in the contact system drastically.

Further, the longitudinal contact members 114 may be producible by press-forming. Advantageously, this provides for producing the tubular contact conductor 104 from a single tubular part such as a copper tube of suitable diameter.

Press-forming is a technique known per se to the skilled person. Generally, press-forming relies on altering the shape of e.g. a metal workpiece by applying pressure to the workpiece.

The thickness of the walls of the tubular body conductor 102 and the at least partly tubular contact conductor 104 may depend on the specific implementation but is often in the range of a few millimeters. Preferably, the length of the overlap region 110 along the longitudinal axis 112 is substantially larger than the thickness of any one of the tubular body conductor 102 and the at least partly tubular contact conductor 104 in the overlap region. The thickness here refers to the wall thicknesses of the tubular body conductor and the at least partly tubular contact conductor. An example length of the overlap region may be e.g. 25 mm, 30 mm, 35 mm, 40 mm, 45 mm, 50 mm, 55 mm, etc.

Figure 2:
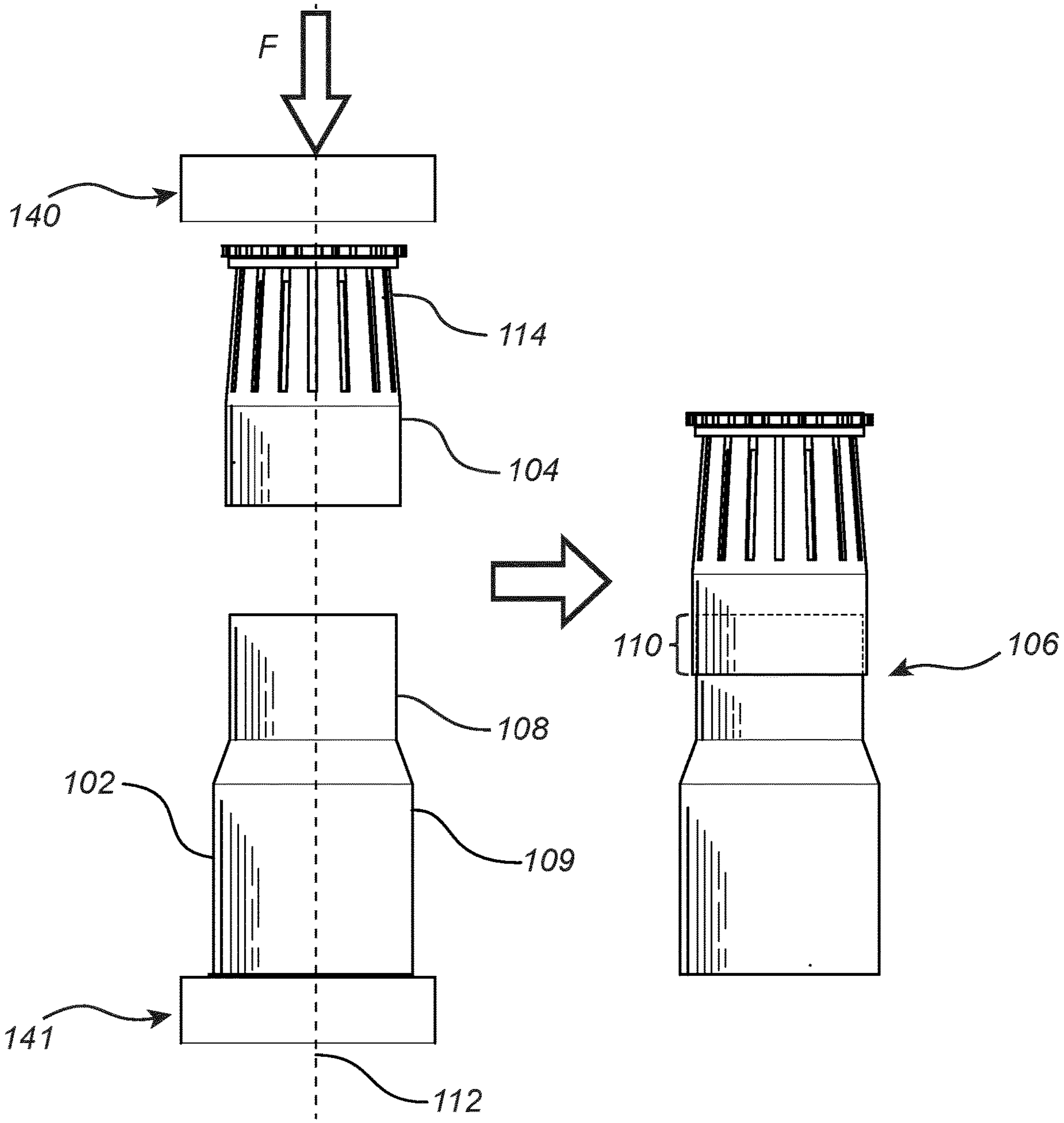
FIG. 2 conceptually illustrates a process for electrically and mechanically joining a tubular body conductor and a tubular contact conductor according to an embodiment of the disclosure.

FIG. 2 conceptually illustrates the formation of the overlap region 110 and thereby the joint between the tubular body conductor 102 and the at least partly tubular contact conductor 104.

The tubular body conductor 102 and the at least partly tubular contact conductor 104 are arranged with the longitudinal axes aligned, thereby sharing a common longitudinal axis 112. A fitting portion 108, i.e. the tubular end portion of the tubular body conductor 102 is fitted inside the tubular end portion 106 of the tubular contact conductor 104. However, in order to ensure a strong mechanical bond with satisfactory electrical conductively the outer diameter of the fitting portion 108 is somewhat larger than the inner diameter of the tubular end portion 106. In other words, when the fitting portion 108 of the tubular body conductor 102 is pressed into the tubular end portion 106 of the tubular contact conductor 104, the outer one, here the tubular end portion 106 expands radially as a result of the pressing, and the inner fitting portion 108 is somewhat compressed. The fitting portion 108 here has a smaller diameter than a neighboring portion 109, where at least part of the fitting portion is included in the overlap region 110. However, the fitting portion 108 may equally well have the same diameter as the neighboring portion 109.

For forming the overlap region 110, one of the tubular body conductor 102 and the tubular contact conductor 104 is longitudinally press-fitted into the other one of the tubular body conductor 102 and the tubular contact conductor 104 using a pressing tool 140 adapted to give mechanical support to the contact crown, i.e. the tubular contact conductor 104 with its contact fingers 114 to avoid buckling of the contact crown. In other words, as illustrated in FIG. 2, with the tubular body conductor 102 and the at least partly tubular contact conductor 104 are arranged with the longitudinal axes aligned and the fitting portion 108 arranged at the tubular end portion 108, a force F is applied along the longitudinal axis 112 while the tubular body conductor 102 is supported by a support structure 141 sufficiently strong to withstand the force F. In this way is the fitting portion 108 forced, with brute force, into the hollow space inside the tubular end portion 106. This may further lead to that the outer one of the tubular end portions expands radially as a result of the longitudinal press-fitting. Radially is here in a direction orthogonal to the longitudinal axis 112.

The diameter mismatch between the tubular body conductor 102 and the tubular contact conductor 104, i.e. in the fitting portion 108 is relatively high to provide even stronger mechanical bond with improved electrical conductivity. However, larger mismatch may employ larger force F for pressing the tubular body conductor 102 and the tubular contact conductor 104 against each other to form the overlap region 110. As an example, the mismatch in diameter may be for example 0.3 mm, 0.4 mm, 0.5 mm, 0.7 mm, 0.8 mm to mention a few examples. However, other diameter mismatches are conceivable. A relatively large diameter mismatch provides an improved joint even at molecular level, e.g. the material blend in the overlap region. Further, a with the herein longitudinal press-fitting, oxide layers in the joint are prevented with a resulting low contact resistance.

The top of the fitting portion 108 may comprised a chamfered portion to better guide the fitting portion 108 into the tubular end portion 106.

At normal use the circuit breaker interrupter contacts will be in closed position forming a conductor of the service current. Higher current loads will generate heat in the conductor arrangement and this increased temperature will result in thermal expansion of the metallic parts. Due to the different materials of the tubular end portions of the tubular body conductor 102 and the least partly tubular contact conductor 104, their thermal expansion properties should preferably be addressed to better withstand thermal cycling. For this, a thermal expansion coefficient of the inner one of the tubular end portions of the tubular body conductor 102 and the least partly tubular contact conductor 104 in the overlap region is larger than the thermal expansion of the outer one. In other words, in the depicted embodiments of FIGS. 1 and 2, the thermal expansion coefficient of the fitting portion 108 is larger than the thermal expansion coefficient of the tubular end portion 106. This ensures that as the temperature of the tubular body conductor 102 and the least partly tubular contact conductor 104 rises due to electrical dissipation in the material when conducting electrical current, the inner tube expands more than the outer tube so that the joint in the overlap region is efficiently maintained. For example, aluminum have slightly higher expansion coefficient and it will therefore expand slightly more than the copper tubular contact and increase the grip, and thereby increase the mechanical strength and theoretically also reduce resistance over the joint.

Figure 3:
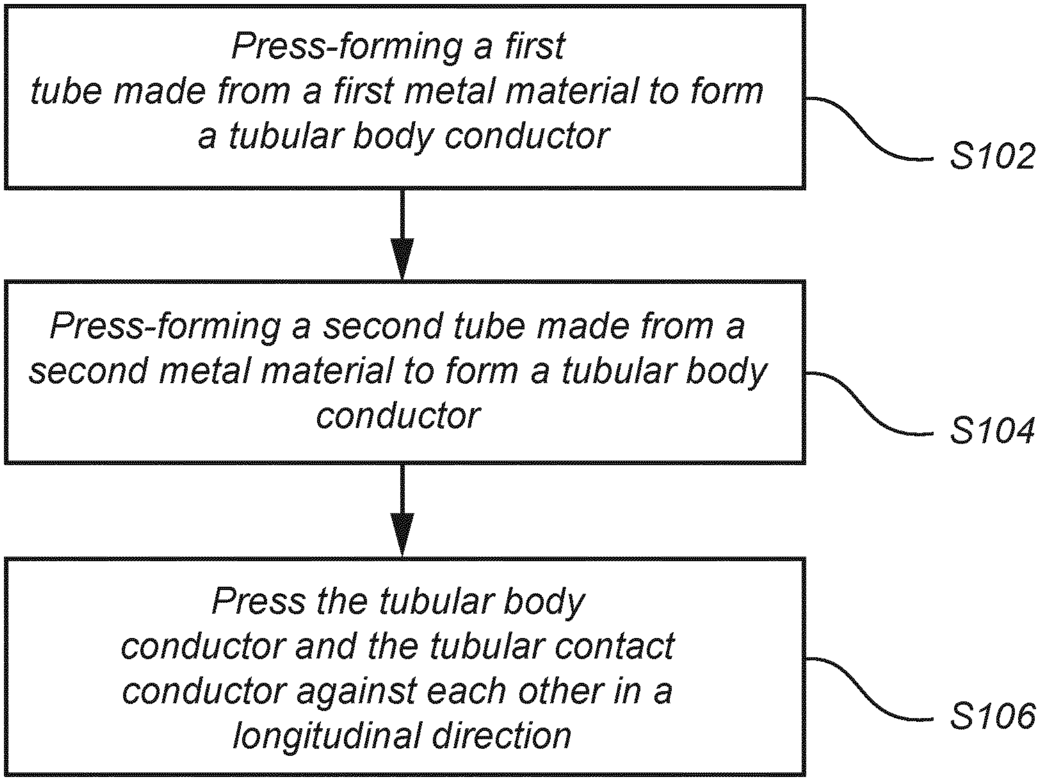
FIG. 3 is a flow-chart of method steps according to embodiments of the present disclosure.

FIG. 3 is a flow-chart of method steps for manufacturing a conductor path for a circuit breaker interrupter. The conductor path may be provided by a conductor arrangement 100 formed by the described method. The method comprises a step S102 of press-forming a first tube made from a first metal material to form a tubular body conductor comprising a tubular end portion. In step S104, press-forming a second tube made from a second metal material to form a tubular contact conductor comprising a tubular end portion and longitudinal contact members on an opposite side from the tubular end portion. The longitudinal contact members being adapted for making electric contact with an external contact. Further, as described with reference to FIG. 2, in step S106 pressing the tubular body conductor 102 and the tubular contact conductor 104 against each other in a longitudinal direction of the tubular body conductor and the tubular contact conductor so that an overlap region 110 is produced where the tubular body conductor 102 and the tubular contact conductor 104 are mechanically and electrically connected to each other. Press in a longitudinal direction relates to a linear pressing motion caused by the force F. The force for pressing the tubular body conductor and the tubular contact conductor together to form the overlap region may be about 3000 N.

Figure 4:
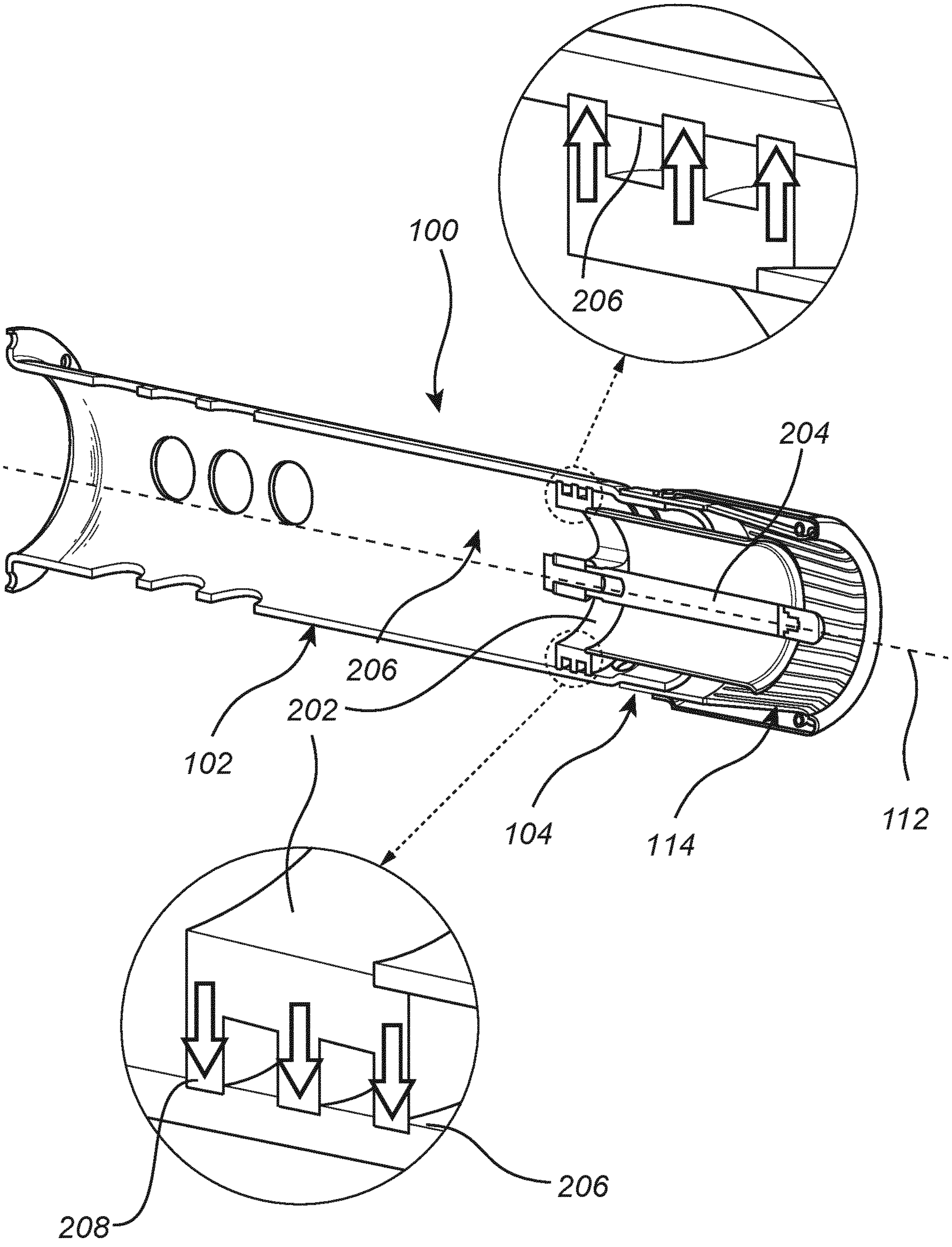
FIG. 4 is a perspective cross-sectional view of a conductor arrangement according to an embodiment of the disclosure.

FIG. 4 conceptually illustrates a conductor arrangement 100 according to embodiments described herein. The conductor arrangement comprises an arcing contact holder flange 202 adapted to hold an arcing contact pin 204 for the circuit breaker interrupter. The arcing contact holder flange 202 is attached inside and along an inner circumference of the tubular body conductor 102 by radially compressing the tubular body conductor onto the arcing contact holder flange 202.

Advantageously, the arcing contact holder flange 202 comprises radially protruding attachment members 204 adapted to permanently deform the inner surface 206 of the tubular body conductor 102 when the tubular body conductor is radially compressed onto the arcing contact holder flange.

The complete current path through the conductor arrangement 100 comprises a main current path that leads the electrical current in closed position, through the aluminum tubular body conductor 102 and the copper contact crown 104 comprising the longitudinal contact members 114. Generally, during interruption in the circuit breaker interrupter, the copper contact crown 104 is separated from a main contact of a secondary component (not shown) which it is intended to be connected to. The current will then be directed from the aluminum tubular body conductor 102 through the arcing contact holder flange 202 and via the arcing pin 204 to arcing contacts of the secondary component.

Figure 5:
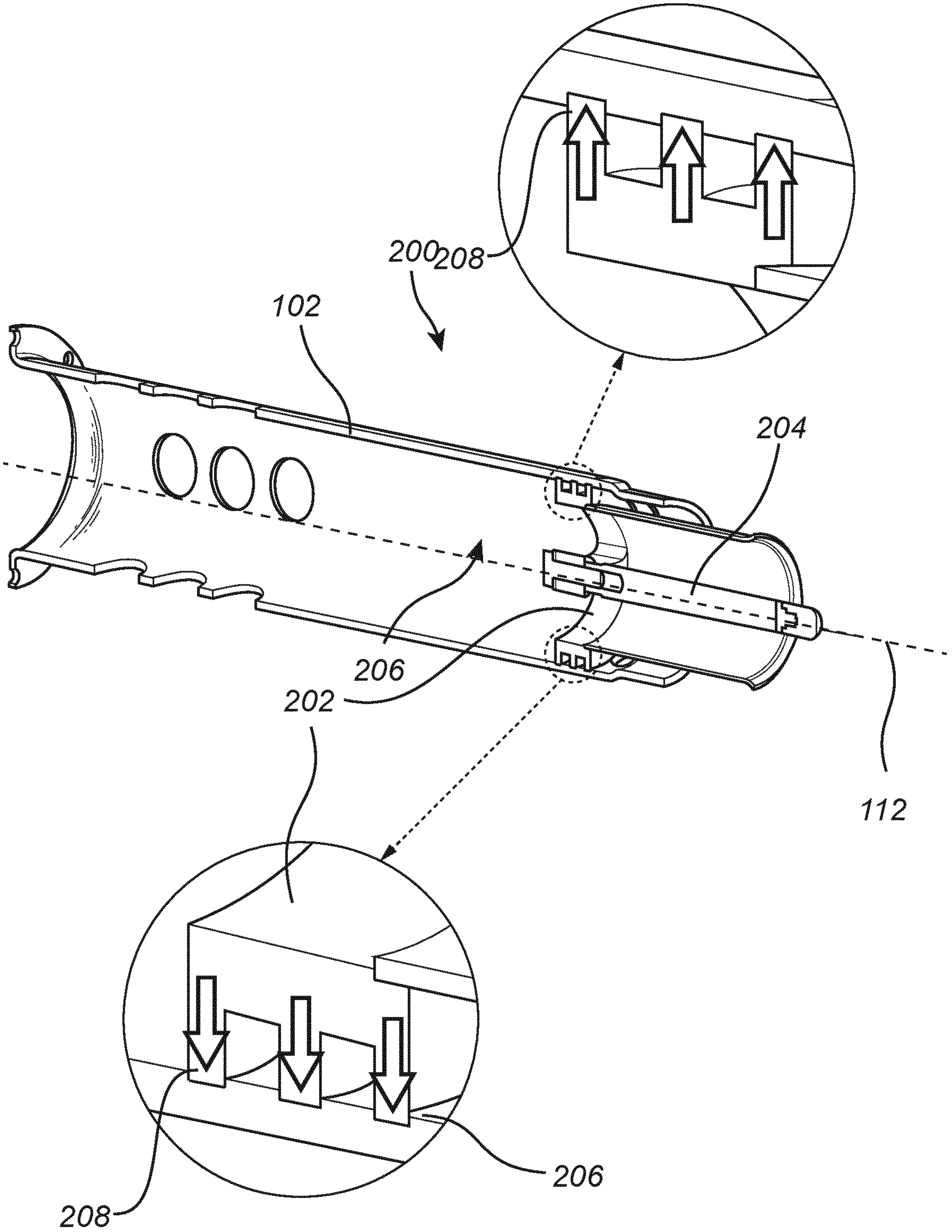
FIG. 5 is a perspective cross-sectional view of a conductor assembly according to embodiments of the disclosure.

FIG. 5 conceptually illustrates a conductor assembly 200 for a circuit breaker interrupter. The conductor assembly 200 comprising a tubular body conductor 102 comprising a first metal material. Further, the conductor assembly 200 comprises an arcing contact holder flange 202 comprising a third metal material and being adapted to hold an arcing contact pin 204 for the circuit breaker interrupter. The arcing contact holder flange 202 is attached inside, i.e. to an inner side 206 and along an inner circumference of the tubular body conductor 102 by radially compressing the tubular body conductor 102 onto the arcing contact holder flange 202.

The arcing contact holder flange 202 comprises radially protruding attachment members 208 adapted to permanently deform the inner surface 206 of the tubular body conductor 102 when the tubular body conductor 102 is radially compressed onto the arcing contact holder flange 202. A radial compression is performed by applying a force orthogonally to the longitudinal axis 112 of the tubular body conductor 102.

Preferably, the first metal material is softer than the third metal material. For example, the material of the tubular body conductor 102 may be aluminum and the material of the arcing contact holder flange 202 may be steel.

Even though the disclosure has been described with reference to specific exemplifying embodiments thereof, many different alterations, modifications and the like will become apparent for those skilled in the art.

Additionally, variations to the disclosed embodiments can be understood and effected by the skilled person in practicing the claimed disclosure, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. A conductor arrangement for a circuit breaker interrupter, the conductor arrangement comprising:

a tubular body conductor comprising a first metal material; and a contact conductor comprising a second metal material, the contact conductor being at least partly tubular, a tubular end portion of the tubular body conductor being mechanically and electrically joined with a tubular end portion of the contact conductor in a circumferential overlap region formed by longitudinally press-fitting one of the tubular body conductor and the contact conductor into the other one of the tubular body conductor and the contact conductor, an outer one of the tubular end portion of the tubular body conductor and the tubular end portion of the contact conductor at the overlap region including copper and an inner one of the tubular end portion of the tubular body conductor and the tubular end portion of the contact conductor at the overlap region including aluminum.

2. The conductor arrangement according to claim 1, wherein dimensions of the tubular end portion of the tubular body conductor and the tubular end portion of the contact conductor are such that the outer one of the tubular end portion of the tubular body conductor and the tubular end portion of the contact conductor is expanded radially and the inner one of the tubular end portion of the tubular body conductor and the tubular end portion of the contact conductor is compressed as a result of the longitudinal press-fitting.

3. The conductor arrangement according to claim 1, wherein a thermal expansion coefficient of the inner one of the tubular end portion of the tubular body conductor and the tubular end portion of the contact conductor in the overlap region is larger than a thermal expansion coefficient of the outer one of the tubular end portion of the tubular body conductor and the tubular end portion of the contact conductor in the overlap region.

4. The conductor arrangement according to claim 1, wherein the tubular body conductor is produced from press-forming a tube of one of copper and aluminum and the contact conductor is produced from press-forming of tubes of the other of copper and aluminum.

5. The conductor arrangement according to claim 1, wherein the first metal material is aluminum and the second metal material is copper.

6. The conductor arrangement according to claim 1, wherein the contact conductor comprises longitudinal contact members on an opposite side from the tubular end portion, the longitudinal contact members being formed in one piece with the tubular end portion and extending longitudinally away from the tubular end portion.

7. The conductor arrangement according to claim 6, wherein the longitudinal contact members are producible by press-forming.

8. The conductor arrangement according to claim 1, wherein a length of the overlap region is substantially larger than a thickness of any one of the tubular body conductor and the contact conductor in the overlap region.

9. The conductor arrangement according to claim 1, wherein the tubular end portion of the tubular body conductor comprises a fitting portion having smaller diameter than a neighboring portion, where at least part of the fitting portion is included in the overlap region.

10. The conductor arrangement according to claim 1, comprising an arcing contact holder flange adapted to hold an arcing contact pin for the circuit breaker interrupter, wherein the arcing contact holder flange is attached inside and along an inner circumference of the tubular body conductor by radially compressing the tubular body conductor onto the arcing contact holder flange.

11. The conductor arrangement according to claim 10, wherein the arcing contact holder flange comprises radially protruding attachment members adapted to permanently deform an inner surface of the tubular body conductor when the tubular body conductor is radially compressed onto the arcing contact holder flange.

12. The conductor arrangement according to claim 1, wherein the conductor arrangement comprises a conductor assembly for the circuit breaker interrupter, wherein the conductor assembly comprises:

the tubular body conductor comprising the first metal material, and an arcing contact holder flange comprising a third metal material and being adapted to hold an arcing contact pin for the circuit breaker interrupter, wherein the arcing contact holder flange is attached inside and along an inner circumference of the tubular body conductor by radially compressing the tubular body conductor onto the arcing contact holder flange.

13. The conductor arrangement according to claim 12, wherein the first metal material is softer than the third metal material.

14. A method for manufacturing a conductor path for a circuit breaker interrupter, the method comprising:

press-forming a first tube made from a first metal material to form a tubular body conductor comprising a tubular end portion;

press-forming a second tube made from a second metal material to form a tubular contact conductor comprising a tubular end portion and longitudinal contact members on an opposite side from the tubular end portion, the longitudinal contact members being adapted for making electric contact with an external contact; and pressing the tubular body conductor and the tubular contact conductor against each other in a longitudinal direction of the tubular body conductor and the tubular contact conductor so that an overlap region is produced where the tubular body conductor and the tubular contact conductor are mechanically and electrically connected to each other, wherein an outer one of the tubular end portion of the tubular body conductor and the tubular end portion of the tubular contact conductor at the overlap region comprises copper and an inner one of the tubular end portion of the tubular body conductor and the tubular end portion of the tubular contact conductor at the overlap region comprises aluminum.

15. The method according to claim 14, wherein pressing the tubular body conductor and the tubular contact conductor against each other causes the outer one of the tubular end portion of the tubular body conductor and the tubular end portion of the tubular contact conductor to expand radially and the inner one of the tubular end portion of the tubular body conductor and the tubular end portion of the tubular contact conductor to be compressed.

16. The method according to claim 14, wherein a thermal expansion coefficient of the inner one of the tubular end portion of the tubular body conductor and the tubular end portion of the tubular contact conductor in the overlap region is larger than the thermal expansion coefficient of the outer one of the tubular end portion of the tubular body conductor and the tubular end portion of the tubular contact conductor in the overlap region.

17. A circuit breaker interrupter comprising
an arcing contact pin; and
a conductor arrangement comprising:
a tubular body conductor comprising a first metal material; and
a contact conductor comprising a second metal material, the contact conductor being at least partly tubular,
a tubular end portion of the tubular body conductor being mechanically and electrically joined with a tubular end portion of the contact conductor in a circumferential overlap region formed by longitudinally press-fitting one of the tubular body conductor and the contact conductor into the other one of the tubular body conductor and the contact conductor, an outer one of the tubular end portion of the tubular body conductor and the tubular end portion of the contact conductor at the overlap region including copper and an inner one of the tubular end portion of the tubular body conductor and the tubular end portion of the contact conductor at the overlap region including aluminum.

18. The circuit breaker interrupter according to claim 17, wherein dimensions of the tubular end portion of the tubular body conductor and the tubular end portion of the contact conductor are such that the outer one of the tubular end portion of the tubular body conductor and the tubular end portion of the contact conductor is expanded radially and the inner one of the tubular end portion of the tubular body conductor and the tubular end portion of the contact conductor is compressed as a result of the longitudinal press-fitting.

19. The circuit breaker interrupter according to claim 17, wherein the conductor arrangement further comprises an arcing contact holder flange adapted to hold the arcing contact pin, wherein the arcing contact holder flange is attached inside and along an inner circumference of the tubular body conductor by radially compressing the tubular body conductor onto the arcing contact holder flange.

20. The circuit breaker interrupter according to claim 19, wherein the arcing contact holder flange comprises radially protruding attachment members adapted to permanently deform an inner surface of the tubular body conductor when the tubular body conductor is radially compressed onto the arcing contact holder flange.

* * * * *